Sept. 15, 1970     K. H. SCHWARZ     3,528,674

SKI SLED

Filed April 19, 1968     2 Sheets-Sheet 1

INVENTOR
Karl H. Schwarz

BY Schmidt, Johnson, Hovey,
Williams & Bradley.
ATTORNEYS.

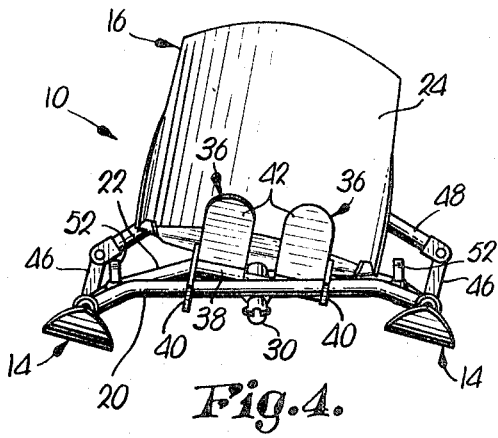
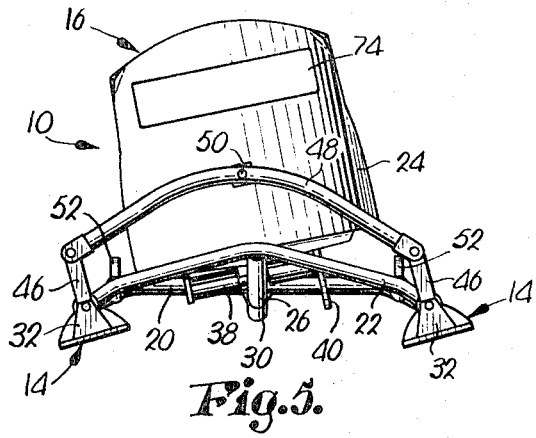
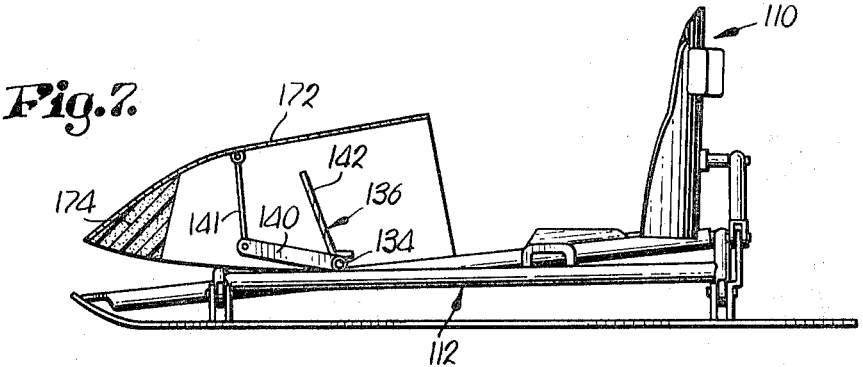
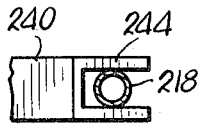
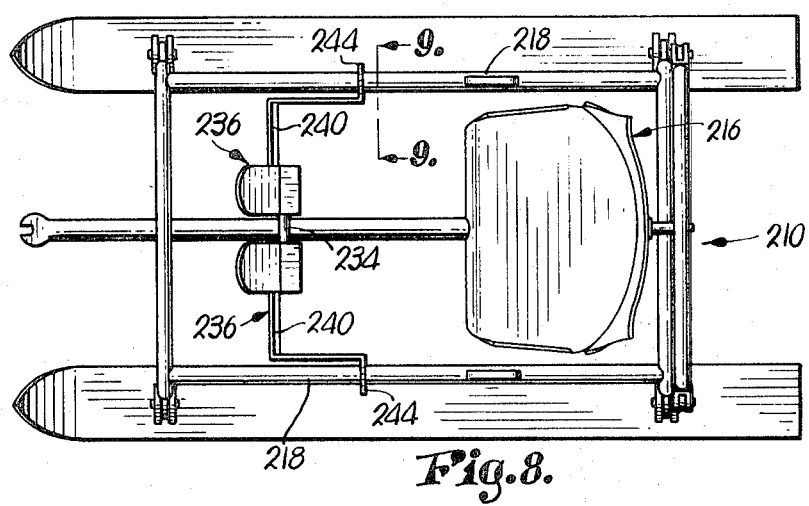
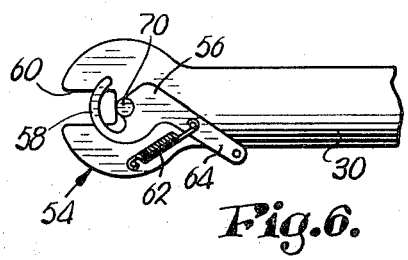

United States Patent Office 3,528,674
Patented Sept. 15, 1970

3,528,674
SKI SLED
Karl H. Schwarz, Fairway, Kans., assignor to Puritan-Bennett Corporation, a corporation of Delaware
Filed Apr. 19, 1968, Ser. No. 722,624
Int. Cl. B62b 13/08
U.S. Cl. 280—21                                   9 Claims

ABSTRACT OF THE DISCLOSURE

A sled having a rigid frame supported by a pair of elongated skis each pivotally coupled to the frame for swinging relative thereto about respective spaced-apart, parallel, fore and aft axes. A seat is provided with a rigid, forwardly projecting, tubular sleeve journalled on a shaft to permit swinging of the seat about an intermediate axis lying in a plane parallel with said fore and aft axes. A pair of cranks, each pivotally connecting said frame and a crossarm rigidly carried by the sleeve, permit manual rotation of said sleeve in either direction about the intermediate axis. Parallel linkage pivotally interconnecting the skis and the seat swing the skis about their respective fore and aft axes for steering the vehicle responsive to the rotation of the sleeve produced by manual swinging of said cranks about said crossarm.

---

This invention refers to vehicles, and more particularly to a ski-mounted vehicle adapted to be towed over the surface of a supporting medium such as a body of water or the like.

It is the primary object of the instant invention to provide a ski vehicle which may be steered by manipulation of foot pedals.

Another important object of this invention is the provision of steering means associated with a movable seat so that an appropriate shift of body weight of the occupant for banking the vehicle accompanies steering of the vehicle into a turn.

Another very important object of this invention is the provision of parallel linkage interconnecting the skis and the steering means so that both skis are always moved simultaneously in the same direction and through the same distance in response to movement of the steering means to insure proper control over the vehicle at all times.

Still a further object of the invention is to provide an easily controlled, highly versatile ski sled which may be relatively economically manufactured, yet which is of rugged, lightweight construction.

These and other objects of the present invention will be more fully explained or will become apparent from the drawings and from the following specification and claims.

In the drawings:

FIG. 4 is a front elevational view thereof;

FIG. 5 is a rear elevational view thereof;

FIG. 6 is a fragmentary, enlarged top plan view of a towing latch adapted for releasably securing the sled to a towing element;

FIG. 7 is a view similar to FIG. 2 and illustrating a modified form of sled constructed pursuant to the principles of this invention, the hood being shown in vertical cross section to reveal details of construction;

FIG. 8 is a view similar to FIG. 3, but illustrating still another modified form of the sled; and FIG. 9 is an enlarged, detailed, vertical, cross-sectional view taken along line 9—9 of FIG. 8.

Figure 1:
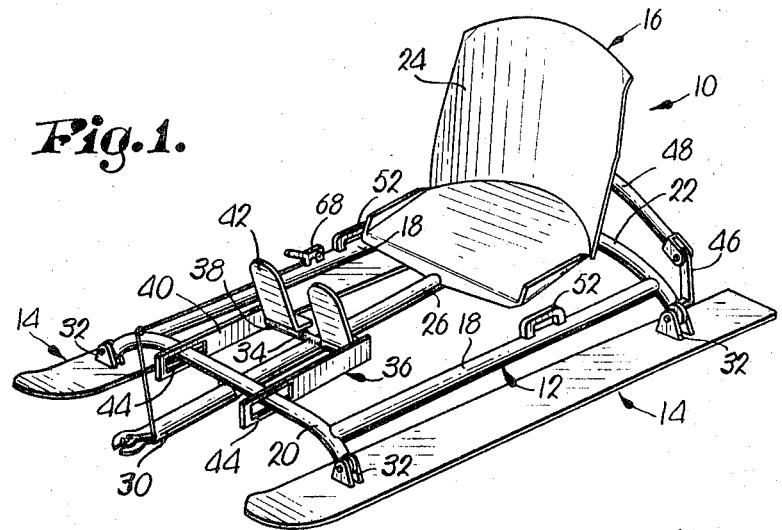
FIG. 1 is a left-front perspective view of a ski sled embodying the principles of this invention.
Figure 2:
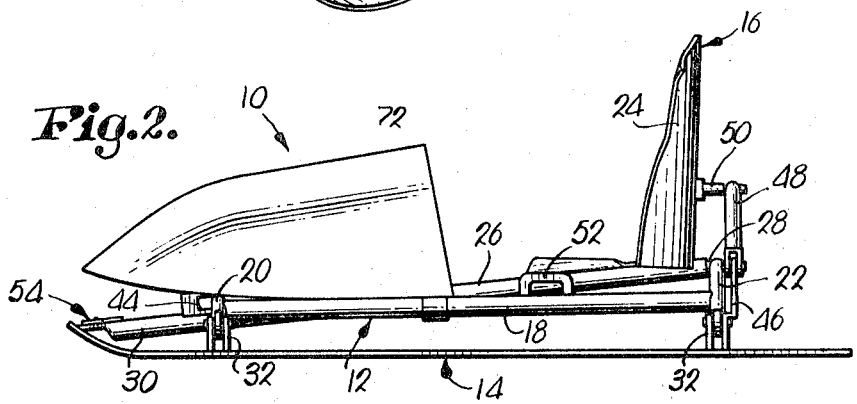
FIG. 2 is a side elevational view of the sled of FIG. 1 showing an optional hood mounted on the sled.
Figure 3:
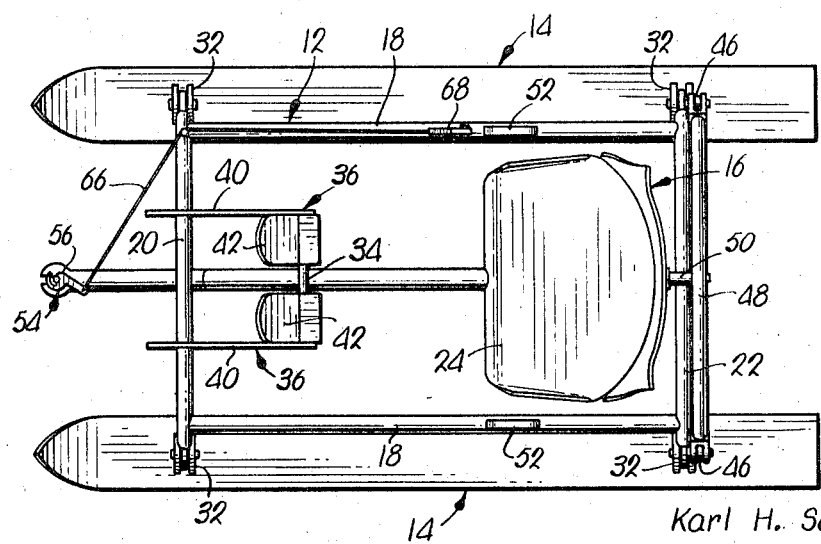
FIG. 3 is a top plan view of the sled of FIG. 1.

A ski sled embodying the principles of this invention is illustrated in FIGS. 1–5 and is designated by the numeral 10. Sled 10 includes a frame 12, a pair of skis 14 swingably mounted to the frame 12 and seat structure 16 swingably mounted on the frame. Frame 12 includes a pair of spaced-apart, elongated, rigid side members 18 interconnected by transversely extending, generally bowed, rigid cross members 20 and 22 respectively to form a generally rectangular skeletal frame structure.

Seat structure 16 includes a seat 24 which is rigidly secured to an elongated, tubular, rigid element 26 projecting forwardly from seat 24 and underlying the latter. A shaft 28 (FIG. 2) is integral with rear cross member 22 and extends forwardly intermediate side members 18 of frame 12. Shaft 28 is received within tubular element 26 and is integrally connected at the forward end of sled 10 with an elongated, rigid projection 30 rigidly secured to front cross member 20. Thus, shaft 28 defines an intermediate axis for swinging of seat 24 on frame 12. The axis defined by shaft 28 lies in a vertical plane which is parallel with the longitudinal axes of skis 14. Further, each ski 14 is provided with front and rear parallel brackets 32 which cooperate with the corresponding ends of cross members 20 and 22 respectively for pivotally coupling skis 14 to frame 12 so that the skis are swingable about spaced-apart, parallel axes which coincide with the respective longitudinal axes of the skis 14.

An elongated, rigid crossbar 34 is rigidly secured intermediate its ends to element 26 in forwardly spaced relationship from the front edge of seat 24. Each projecting end of bar 34 has a device 36 in the nature of a foot-operated crank pivotally mounted thereon. To this end, each device 36 includes a tubular member 38 telescopically received over the corresponding projecting end of bar 34. A forwardly extending arm 40 is rigidly secured to the tubular member 38 and also to a generally upwardly extending foot pedal 42. An elongated slot 44 in arm 40 receives the front cross member 20 of frame 12 as illustrated in FIG. 1. Thus, pressure exerted against pedal 42 swings the latter about crossbar 34 and results in a lifting of the corresponding projecting end of bar 34 by virtue of downward pressure against cross member 20 exerted by the respective arm 40 of device 36. This lifting causes seat structure 16 to swing about its intermediate axis defined by shaft 28 and element 26. The swinging of seat structure 16 is in a direction away from the pedal 42 which receives the pressure. Manifestly, the other pedal 42 swings rearwardly as its corresponding projecting end of bar 34 moves downwardly in response to the upward movement of the other projecting end of bar 34.

The rearmost bracket 32 of each ski 14 is provided with an upwardly extending integral, rigid arm 46. The uppermost ends of the arms 46 are received in and pivotally coupled to the bifurcated ends of a tie rod 48. The midpoint of tie rod 48 is pivotally coupled to a rearwardly projecting stub shaft 50 which is integrally secured to the rear surface of seat 24 in vertically spaced relationship from the intermediate axis which defines the axis of swinging movement of seat structure 16 on shaft 28. The distance between rearwardly projecting stub shaft 50 and the seat axis 28 and its relation to the lengths of rigid arm 46 of the rearmost brackets 32 controls the relative inclination of seat 24 and skis 14. Therefore, if this distance is equal, seat 24 and skis 14 bank in a parallel manner, whereas a larger distance between the stub shaft 50 and seat axis 28 causes the skis 14 to incline more than the plane of the seat 24. Such a slight mismatch is particularly helpful during highspeed wide curbing.

A handle 52 is disposed on each fore and aft frame member 18 in proximity to seat 24 so that the user may conveniently grip either handle. A latch 54 is mounted on projection 30 at the front of sled 10 and a swingable latch member 56 illustrated more specifically in FIG. 6 has an arcuate hook 58 which cooperates with a slot 60 in projection 30 to releasably capture a towing element or the like (not shown) for securing sled 10 to a towing vehicle. A spring 62 having one end thereof secured to an arm 64 of latch member 56 holds hook 58 in the position illustrated in FIG. 6. An elongated, flexible element 66 is secured to arm 64 and is connected with a lever 68 mounted on one side member 18 so that the operator may operate lever 68 to pull element 66 for swinging member 56 about an axis defined by a pin 70 so that the hook 58 releases the towing element.

In operation of sled 10, the frame 12 is supported in a generally horizontal position over the surface of a medium such as a body of water. Forward movement of sled 10 imparted by the towing vehicle insures that the skis 14 maintain the sled above the water and support the weight of a person sitting on seat 24. The occupant of seat 24 may steer the sled simply by applying pressure to either of the side-by-side foot pedals 42. For example, if it is desired to turn to the left, the occupant presses on the right pedal 42 which swings bar 34 in a counterclockwise direction as viewed looking forwardly of sled 10. This swings seat 24 to the left as viewed by the occupant. The swinging of seat 24 moves tie rod 48 in the same direction and cants the skis 14 about their respective fore and aft axes as illustrated in FIGS. 4 and 5. The canting of the skis results in steering of the vehicle from its original direction of travel and toward the left. Manifestly, the sled 10 may be steered to the right simply by the operator pushing on the left pedal 42 which produces the same result but in an opposite direction.

It will be understood by those skilled in this art that the operator can assist in the steering by pulling on either of the handles 52 to cause relative swinging of the seat 24 about frame 12 in either direction. Thus, with the sled 10 as illustrated and described, the steering could be accomplished without use of the devices 36. Instead, the operator would have to steer the sled with his hands by pulling on the frame member in the direction of the desired turn of sled 10.

An optional hood 72 may be mounted on frame 12 in covering relationship to the devices 36 if desired. Such hood 72 is shown in place in FIG. 2. Further, as is illustrated in FIG. 5, a flotation structure 74 may be secured to the vehicle to prevent the same from sinking when the forward speed of sled 10 is reduced below that which is necessary for supporting the same upon the water. Manifestly, as many flotation structures 74 as may be required for this purpose are mounted in convenient locations on sled 10.

Referring now particularly to FIG. 7, a modified sled 110 is constructed identically with sled 10 with the exception of a different steering device as will be explained. Accordingly, it is not necessary to describe the other components of sled 110. It suffices to say that the forwardly extending arms 140 of the respective steering devices 136 are pivoted to one end of an elongated rod 141. The other end of rod 141 is pivotally coupled to the underside of hood 172. Thus, hood 172 serves as a support overlying the transversely extending rod 134 and the devices 136. Since hood 172 is supported on frame 112, it will be apparent that pushing on the respective foot pedals 142 causes a corresponding swinging of the transverse bar 134 in exactly the same manner as has been described with respect to the operation of sled 10. It may be noted that a flotation structure 174 is illustrated in the forward projecting portion of hood 172 of sled 110.

Referring now to FIGS. 8 and 9, a still further modified form of vehicle embodying the principles of this invention is denominated by the numeral 210. Again, the only difference between sled 210 and sled 10 resides in the construction of the steering devices 236. In this case, the arms 240 are L-shaped and project rearwardly from the axis of swinging of the devices 236 about the transverse bar 234. The L-shaped arms 240 terminate in outwardly extending forks 244, the bifurcation of which is received over the corresponding fore and aft side members 218. Thus, since the engagement of the devices 236 with side member 218 is rearwardly of the axis of swinging movement of the devices on the crossbar 234, the seat structure 216 is swung in the direction of the particular device which is moved forwardly about its pivot on bar 234. Thus, if the operator desires to steer sled 210 to the right, he merely presses on the right foot pedal. Conversely, steering to the left is accomplished by pressing on the left foot pedal. This correlation between direction of steering and the location of the steering device has the advantage of simplifying this feature of the control of sled 210 over that of sled 10 or sled 110 which has been previously described. However, it is to be understood that the fulcrum arrangement particularly detailed in FIG. 9 is only one of a number of equivalent structures which may be utilized within the concepts of this invention.

Having thus described the invention, what is claimed as new and desired to be secured by Letters Patent is:

1. A ski sled comprising:
   a frame,
   said frame including a pair of spaced-apart side members and a cross member interconnecting the side members;
   a pair of skis pivotally coupled with the frame for swing movement about respective spaced-apart, fore and aft axes;
   seat structure;
   means mounting the seat structure on the frame for swinging about an intermediate axis lying in a plane between and extending generally parallel to said fore- and aft axes,
   said seat structure including a seat, and an elongated bar rigidly connected to the seat and extending transversely of said intermediate axis in opposite direction therefrom; a pair of manually actuatable crank assemblies pivotally coupled respectively with opposite end portion of the bar and said cross member for swinging said seat structure in response to manual force applied to either of said assemblies; and
   linkage pivotally interconnecting the seat structure with each ski respectively for swinging the ski about said respective fore and aft axes responsive to swinging of the seat structure about said intermediate axis through actuation of either of said assemblies to steer the sled.

2. The invention of claim 1, wherein said cross member is disposed forwardly of the bar.

3. A ski sled comprising:
   a frame;
   a pair of skies pivotally coupled with the frame for swinging movement about respective spaced-apart, fore and aft axes;
   seat structure;
   means mounting the seat structure on the frame for swinging about an intermediate axis lying in a plane fore and aft axes,
   said seat structure including an elongated, rigid member coinciding with said intermediate axis, a seat rigidly secured to the member and an elongated bar rigidly secured to the member in forwardly spaced relationship from said seat and extending transversely of said intermediate axis in opposite direction therefrom; a pair of manually actuatable devices pivotally coupled with respective opposite end portion of the bar and said frame for pivoting the bar to swing the seat structure in response to manual force applied to either of said devices; and linkage pivotally interconnecting the seat structure with each ski respectively for swinging the skis about said respective fore and aft axes responsive to swinging of the seat structure through actuation of either of said devices to steer the sled.

4. A ski sled comprising:

a frame;

a pair of skis pivotally coupled with the frame for swinging movement about respective spaced-apart, fore and aft axes;

seat structure;

means mounting the seat structure on the frame for swinging about an intermediate axis lying in a plane between and extending generally parallel to said fore and aft axes;

linkage pivotally interconnecting the seat structure with each ski respectively for swinging the skis about said respective fore and aft axes responsive to swinging of the seat structure about said intermediate axis, said linkage including parallel linkage comprising a pair of elongated arms, each arm being rigidly secured to a respective ski and projecting at an angle from the corresponding fore and aft axis, a rigid tie rod pivotally interconnecting said arms at points spaced radially from said fore and aft axes, and means pivotally coupling said seat structure to said tie rod intermediate said pair of arms in radially spaced relationship from said intermediate axis; and actuating means positioned forwardly of said seat structure interconnecting said seat structure and said frame and manually operable for swinging the structure in either direction about said intermediate axis by applying force to said actuating means in a direction substantially parallel to said intermediate axis to swing said skis whereby to steer the sled.

5. A ski sled comprising:

a frame assembly;

a pair of skis pivotally mounted on the frame assembly for swinging movement about generally parallel, spaced axes;

seat structure swingably carried by the frame assembly for pivoting movement about an axis between and parallel to the axes of swinging of the skis;

foot actuatable mechanism connected to and spaced forwardedly from the seat structure operable by a person seated thereon, engageable with the frame assembly, and pivotal about an axis extending transversely of the pivotal axis of the seat structure for swinging the latter in response to manual force applied to the mechanism in a direction substantially parallel to the pivotal axis of the seat structure; and linkage joining the seat structure to said skis for pivoting the latter in unison about their respective axes in response to swinging of the seat structure through actuation of said mechanism to permit steering of the sled.

6. The invention of claim 5, wherein said seat structure includes an elongated, rigid member mounted for rotation about the longitudinal axis thereof which forms the pivotal axis of the seat structure, a seat rigidly mounted on said member, and an elongated element transversely rigid to said member and extending outwardly from each side thereof forwardly of the seat, said mechanism including a pair of force-receiving components adjacent opposite respective ends of said element and pivotally connected thereto for swinging movement about the longitudinal axis of said element in response to manual force applied to one component or the other for turning the sled in a related direction.

7. The invention of claim 6, wherein said frame assembly includes a pair of spaced-apart side members and a cross member interconnecting the side members, said mechanism including a pair of crank arms pivotally coupled to said cross member and rigid to said components respectively for movement therewith about the longitudinal axis of said element.

8. The invention of claim 6, wherein said frame assembly includes a support disposed in vertically spaced relationship above said element, said mechanism including a pair of crank arms rigid to said components respectively and pivotally coupled with with support.

9. The invention of claim 6, wherein said frame assembly includes a fore and aft side member disposed on each side of said seat respectively, said mechanism including a pair of crank arms rigid to said components respectively and pivotally coupled to a corresponding side member in rearwardly spaced relationship along the side member from the longitudinal axis of said element.

References Cited

UNITED STATES PATENTS

| 1,160,569 | 11/1915 | Bourdon | 280—21 |
| 2,323,847 | 7/1943 | Sampsell | 280—21 |
| 2,589,764 | 3/1952 | Basso | 280—21 |
| 3,190,671 | 6/1965 | Fabris | 280—21 |
| 3,421,779 | 11/1969 | Shelby | 280—515 |

FOREIGN PATENTS

| 178,802 | 6/1954 | Austria. |
| 1,032,750 | 1/1951 | France. |

BENJAMIN HERSH, Primary Examiner

R. R. SONG, Assistant Examiner